United States Patent [19]

Banks

[11] 4,183,292

[45] Jan. 15, 1980

[54] CONTINUOUS FLOW SYSTEM FOR EQUALIZING THE MOISTURE CONTENT OF MOISTURE ABSORBING FRUIT PRODUCTS

[75] Inventor: Kenneth A. Banks, East Wenatchee, Wash.

[73] Assignee: Tree Top, Inc., Selah, Wash.

[21] Appl. No.: 841,298

[22] Filed: Oct. 12, 1977

[51] Int. Cl.[2] ............ A23B 7/06; A23B 7/14; A23L 3/18; A23L 3/34

[52] U.S. Cl. ............................. 99/468; 99/473; 99/483; 99/487; 99/516; 366/234; 366/235; 34/50

[58] Field of Search ............ 99/470, 477, 487, 493, 99/483, 516, 517, 355, 468, 473; 34/52, 56, 25, 68, 129, 216, 48, 50; 426/231, 233, 319, 511, 456; 366/15, 22, 144, 151, 180, 186, 188, 192, 220, 234, 235, 184, 193

[56] References Cited

U.S. PATENT DOCUMENTS

| | | | |
|---|---|---|---|
| 1,217,099 | 2/1917 | Lynch | 99/355 |
| 1,303,209 | 5/1919 | King et al. | 34/129 |
| 1,448,431 | 3/1923 | Castruccio | 99/483 |
| 1,788,617 | 1/1931 | Calkins | 366/184 |
| 3,085,492 | 4/1963 | Peebles | 99/355 |
| 3,394,071 | 7/1968 | Gill | 366/234 |
| 3,470,000 | 9/1969 | Hale et al. | 426/319 |
| 3,840,025 | 10/1974 | Fowler et al. | 34/25 |
| 3,982,052 | 9/1976 | Bearce | 34/48 |

*Primary Examiner*—Harvey C. Hornsby
*Assistant Examiner*—Timothy F. Simone
*Attorney, Agent, or Firm*—Seed, Berry, Vernon & Baynham

[57] ABSTRACT

A system for controlling the moisture content of moisture absorbing fruit products to achieve a uniform moisture content of the product. The continuous flow of raw product in chip, diced, extruded or comminuted form initially enters a rotating reel where the product is tumbled and exposed to a high-humidity environment for increasing the moisture content beyond a target value. The added humidity can be in the form of steam or water spray. The product continuously flows from the reel wherein moisture is added to a drying reel which reduces the moisture content of the product to specific target values. Although the original moisture content of raw fruit product entering the system may vary considerably, contact between product during mixing in the moisture adding and drying reels causes the final product to assume uniform and consistent characteristics. Some fruit products to be processed may require sulphur dioxide treatment and in such instances the addition of sulphur dioxide is included in the process and injected with the steam or water spray. In addition or alternatively to adding sulphur dioxide other products such as solids, preservatives or nutrients may be added in the steam or water spray.

5 Claims, 7 Drawing Figures

CONTINUOUS FLOW SYSTEM FOR EQUALIZING THE MOISTURE CONTENT OF MOISTURE ABSORBING FRUIT PRODUCTS

BACKGROUND OF THE INVENTION

1. Field of the Invention

This invention relates primarily to food processing equipment, and, more particularly, to a continuous flow system for controlling the moisture content and sulphur dioxide concentration of food products and more specifically fruits and vegetable products.

2. Description of the Prior Art

Existing processes for controlling and equalizing the moisture content and/or sulphur dioxide concentration of dehydrated apple products are "batch" processes in which discrete quantities of product such as apples, are sequentially processed as a unit. A batch of product in range from 2,000 to 12,000 pounds is initially dried to a moisture content that is lower than the accepted market level which is greater than 14 to 16% but usually about 23%. This overdrying is necessary since fluxuations in moisture content cannot be allowed to exceed the accepted market level or target value since there are no provisions in conventional equalization processes for accurately reducing the moisture content to a specific value. At the same time, the concentration of sulphur dioxide in the product is reduced below the target value. After drying, the batch of product is stored in stationary piles or large revolving drums, and the batches are allowed to sit with or without agitation for a period of time usually between 8 and 48 hours. This storage period allows moisture within the batch to migrate from high to low levels until an overall equilibrium is reached. It is this migration process that is conventionally referred to as "equalizing". After the moisture content and sulphur dioxide concentration of the batch has been equalized, the moisture content of the batch is raised to the target value by the addition of water. This is accomplished by spraying water onto stationary piles of product. An additional equalizing step is sometimes used after the moisture content of the product has been raised. Either shortly before or directly after the moisture content of the product has been adjusted to the target value, the sulphur dioxide concentration is also adjusted in a batch process. This is usually accomplished by the injection of gaseous sulphur dioxide, with or without tumbling, or by placing the product in a chamber in the presence of burning rock sulphur. The product may then be allowed to further equalize for a period of time before being packaged for shipment. In summary, conventional processing techniques first batch dry the product below the target value, and then batch moisturize the product to the target value.

The principal disadvantages of a batch type process are its long process time and high cost. Batch processing systems do not lend themselves to automation so that product measurements and subsequent manipulation must generally be manually accomplished. Furthermore, the processing times for such batch type processes frequently run to as long as 40 hours. Consequently, the capital costs for processing high volumes of products is exceedingly large. Additionally, batch type re-drying processes require high unit costs and they are often detrimental to product quality.

SUMMARY OF THE INVENTION

It is an object of the invention to provide a system for equalizing the moisture and when required the sulphur dioxide content of fruit products which can be readily automated with relative ease thereby reducing the cost of processing the product.

It is another object of the invention to provide a system for equalizing the moisture and sulphur dioxide content of fruit products which requires a relatively short processing time thereby increasing the throughput of such systems.

It is still another object of the invention to provide a system for controlling and equalizing the moisture and sulphur dioxide content of fruit products which consistently produces products of uniformly high quality.

These and other objects of the invention are accomplished by initially increasing the moisture content and sulphur dioxide concentration, if required, in raw fruit products above a predetermined target value. For this purpose, fruit product in chip, diced, extruded or comminuted form are directed into a rotating steaming reel containing a high humidity and sulphur dioxide environment. The humidified product is then transferred to a drying reel either directly or subsequent to a short mixing stage, in which the moisture content of the product is reduced to a predetermined target value. The processed product is then packaged either directly or subsequent to a short mixing stage. It is important to note that the product flows continuously through the processing system, and the rate of travel as well as the operating parameters of the system are adjusted as a function of continuous measurements performed throughout the system. The process is especially adapted to processing fruit products such as apples, but may be adapted to process various fruit products.

DETAILED DESCRIPTION OF THE PREFERRED EMBODIMENTS

Figure 1:
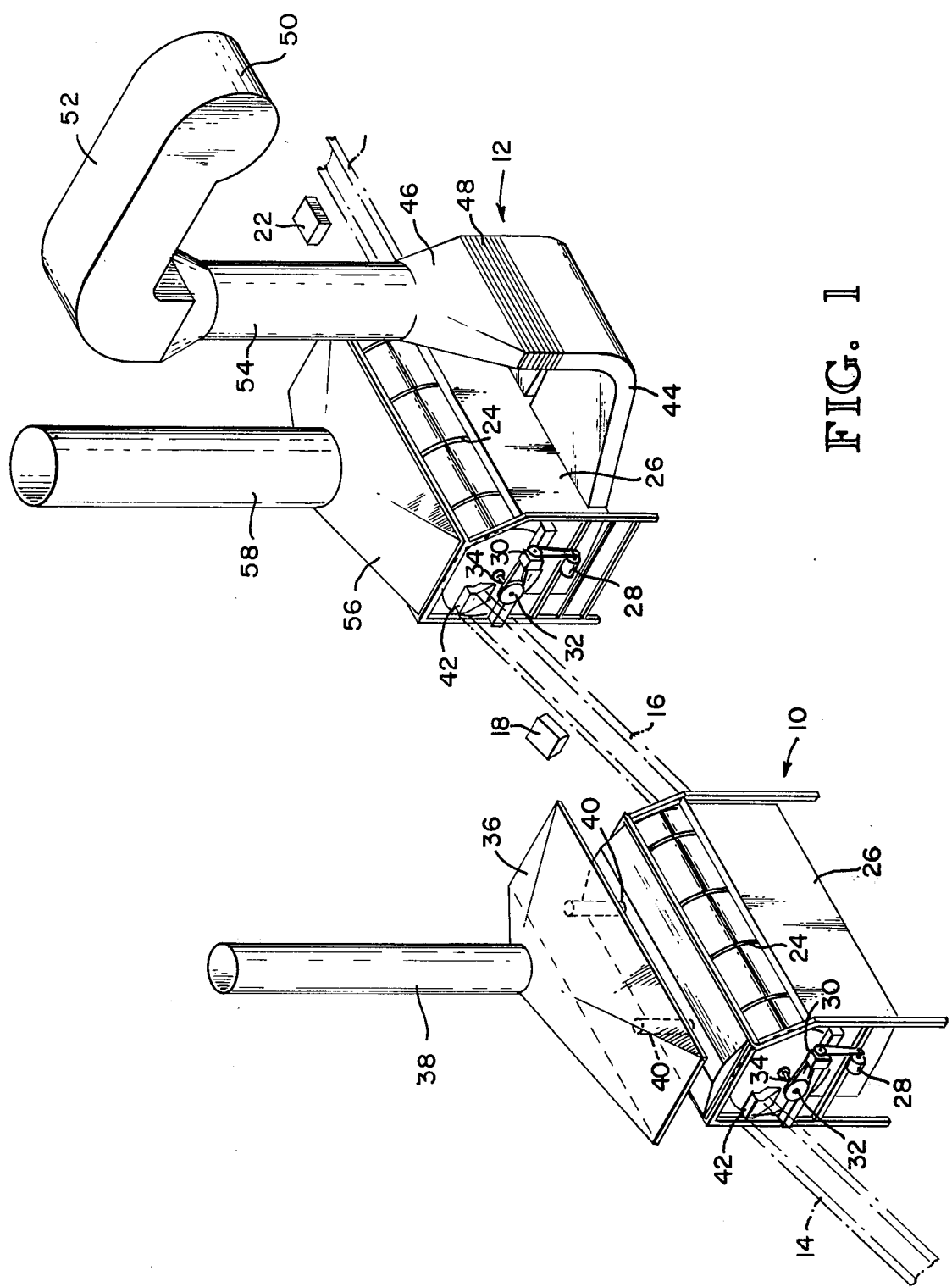
FIG. 1 is an isometric view of the equalizing system showing the steaming and drying reels.

The equalizing system, as illustrated in FIG. 1, includes a steaming unit 10 and a drying unit 12 which are substantially similar in structure to each other. The product to be treated in the desired form is loaded into the steaming unit 10 by an infeed conveyor 14, and the humidified product is transported from the steaming unit 10 to the drying unit 12 by an intermediate conveyor 16. The moisture content of the product carried by the intermediate conveyor 16 is continuously measured by a conventional infrared moisture sensor 18 in order to automatically and continuously adjust the operating parameters of the steaming unit 10. The moisture sensor 18 is commercially available from Moisture Register Company of Alhambra, California. Finally, product having a predetermined moisture content and sulphur dioxide concentration is carried from the discharge end of the drying unit 12 by a discharge conveyor 20. The moisture content of the product carried by the discharge conveyor 20 is also measured by an infrared moisture sensor 22 identical to the moisture sensor 18.

The steaming or moisture increasing unit 10 includes a steaming drum 24 rotatably mounted in a frame 26 and driven by an electric motor 28 through a transfer box 30 and a sheave 32 mounted on a support axle 34 for the reel 24. An exhaust hood 36 overlies the steaming unit 10 to prevent sulphur dioxide and steam from building up inside the building (not shown) housing the steaming unit 10 and drying unit 12. A tubular exhaust conduit 38 vents the exhaust hood 26, and a pair of vent pipes 40 extend between the steaming reel 24 and the exhaust hood 36.

The product entering the steaming unit 10 will generally have a moisture content below the predetermined target value which, for apples, is about 23%. However, under certain circumstances the moisture content of the product may exceed the target value. In either case the moisture content and sulphur dioxide concentration of the product is raised above the target value by injecting steam and sulphur dioxide carried by the steam into the reel 24 as illustrated in greater detail below. For example, for apples having a moisture target value of 23%, the moisture content of the product leaving the steaming unit 10 will generally have a moisture content of about 25%. This "overshooting" is desirable since it allows the moisture content to be reduced to the target value by subsequent drying. The high sugar content of apples and other fruit products causes the product to become quite sticky when moisture is added. This results in adherence to equipment surfaces and very poor transfer qualities. By increasing the moisture content of the product above the target value, the subsequent drying removes surface moisture and tends to seal the surface of the product so that the final product is less sticky. The increased moisture content also allows better penetration of the sulphur dioxide into the product. Thus moisture is added to the product even where the moisture content of the product entering the steaming unit 10 is at or above the target value. In addition to sealing the surface of the product by steaming and then drying, the steam must be used to adjust the sulphur dioxide concentration of the product even when moisture content is at or above the target value. Since the sulphur dioxide is carried by the steam, it would not be possible to adjust the sulphur dioxide concentration upwardly without also increasing the moisture content of the product. As the steaming reel 24 continuously rotates the product contained therein is continuously mixed thereby causing the moisture content and sulphur dioxide concentration of the product to equalize so that the product leaving the steaming unit 10 is relatively uniform in moisture content and sulphur dioxide concentration. The rotational speed of the drying reel 24 as well as the temperature, moisture content and flow rate of the steam entering the unit 10 is adjusted either manually or automatically under the control of the moisture sensor 18 in order to provide the desired operating characteristics. In general, steam flow may be altered by valve adjustment, and sulphur dioxide flow may be adjusted by flow meter adjustment. The required sulphur dioxide concentration is determined by testing the end product in the laboratory and increased or decreased as required.

Product discharged from the steaming unit 10 is carried to an infeed chute 42 of the drying unit 12 by the intermediate conveyor 16. The drying unit 12 is substantially identical to the steaming unit 10. The differences between the units 10, 12 are that the exhaust hood 56 of the drying unit 12 is mounted directly on the frame 26 over the reel 24 whereas the exhaust hood 36 of the steaming unit has a closed bottom and is connected to the closed top of the frame 26 through pipes 40. Also, the drying unit 12 includes an air inlet duct system as explained hereinafter, and this duct system is not found in the steaming unit 10. Consequently, identical reference numerals are used in the two units 10, 12 to designate identical structures. Hot air is injected into the drying unit 12 through a duct system including an inlet duct 44 connected to a transition piece 46 by a flexible boot 48. Air is drawn into the ducting by a conventional roof mounted fan 50 and is heated by a conventional burner 52, preferably fired by natural gas, and conducted to the transition piece 46 through a cylindrical conduit 54. The product entering the drying unit 12 will have a fairly uniform moisture content considerably in excess of the target value. The hot air flowing through the continuously mixing product reduces the moisture content to the target value as measured by the moisture sensor 22. The residence time of the product in the drying is a function of the rotational velocity of the drum 24, the angle of inclination of the drum 24 and the size of the exit port which is adjustable. The moisture sensor 22 can be used to automate the operating characteristics of the drying unit 12 to automatically achieve a desired quantity and uniform moisture content in the product. The hot, humidified air leaving the drying unit 12 is collected by an exhaust vent 56 integrally formed with the housing 26 and conveyed to the atmosphere outside the building through a tubular vent pipe 58.

Figure 2:
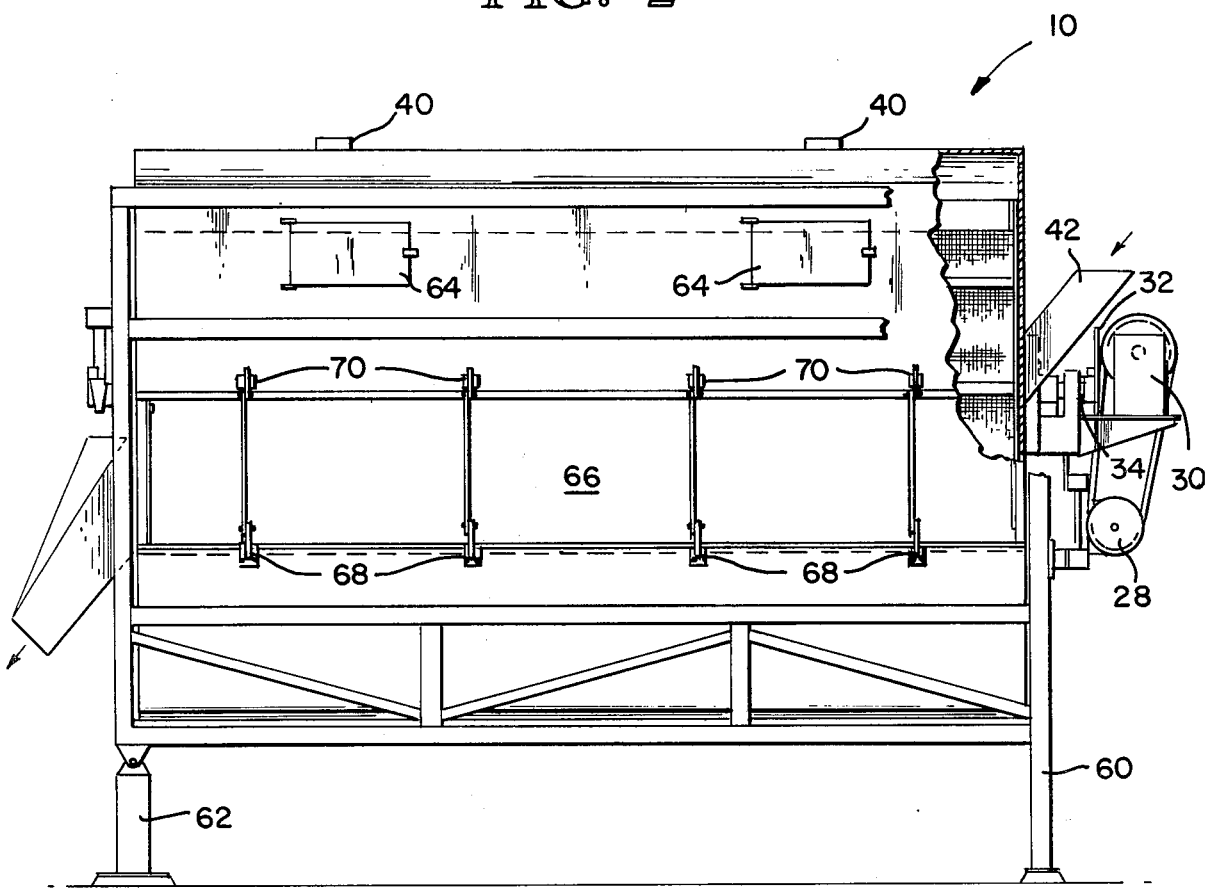
FIG. 2 is a side elevational view, partially cutout, of the steaming reel.
Figure 3:
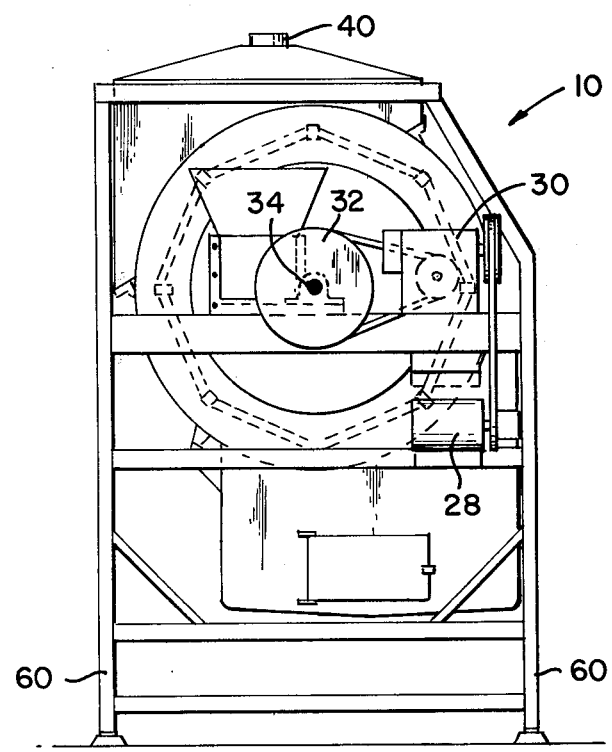
FIG. 3 is an end elevational view of the steaming reel taken from the infeed end.
Figure 6:
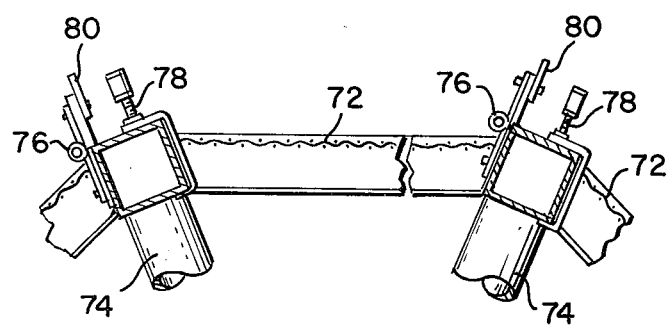
FIG. 6 is a detailed view of the steaming and drying reel structure.
Figure 5:
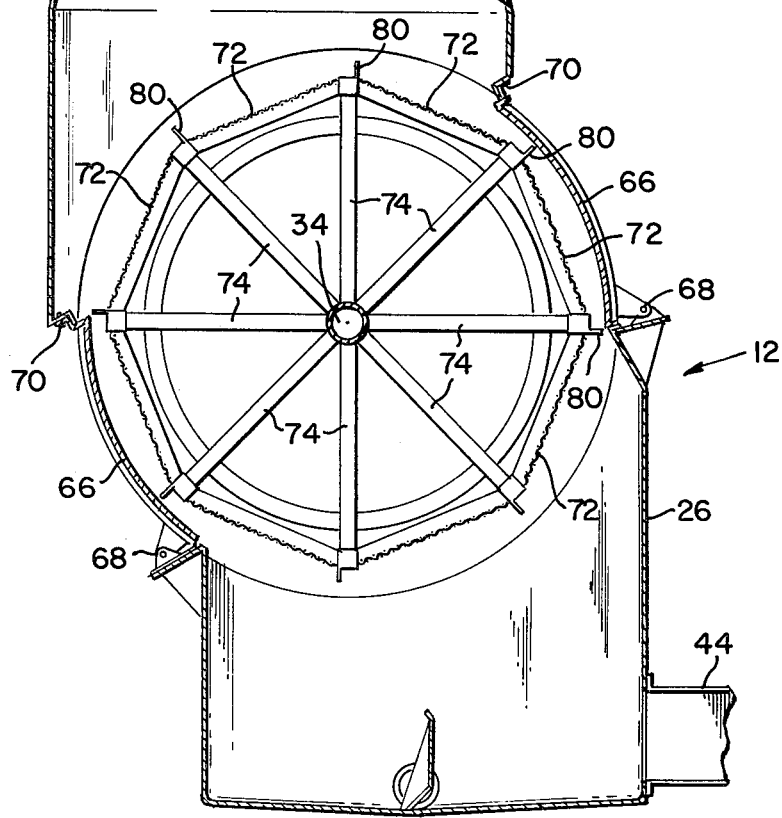
FIG. 5 is a transverse cross-sectional view of the drying reel.

The structure of the steaming and drying units 10, 12, respectively, is illustrated in greater detail in FIGS. 2 and 3. The housing 26 is supported by upstream and downstream legs 60, 62, respectively. The downstream legs 62 are pivotally secured to the frame 26 thereby allowing the height of the upstream legs 60 to be adjusted in order to alter the inclination of the reel 24. Initial tests performed during the installation of the unit 10, 12 are used to determine the optimum angle of inclination of the reel 24 in order to achieve the optimum residence time of the product in the reel 24. The height of the legs 60 is then fixed by suitable means. As best seen in FIG. 1, the exhaust pipes 40 of the steaming unit 10 are flexible thereby allowing the longitudinal and vertical position of the frame 26 to vary slightly during this adjustment. The product conveyed by the inlet conveyor 14 (FIG. 1) is loaded into an inlet hopper 42 which directs it into the reel 24. Inspection access to the reel 24 is provided through doors 64 in the housing 26, and cleaning access is provided through side panels 66 pivotally secured to the housing 26 at 68 and secured at 70. The reel 24 is fabricated, as best illustrated in FIGS. 5 and 6, from a screen 72 connected to the axle 34 through rigid spokes 74. The screen 72 is pivotally secured at 76 to the spokes 74 at one side thereof, and removably clamped to the spokes 74 by releasable clamp 78 at the other end thereof. Thus access to the inside of the reels 24 may be obtained by opening the panels 66 and pivoting the screen 72 outwardly. An elongated plate 80 projecting slightly beyond the outer periphery of the reel 24 prevents the flow of steam or hot air around the periphery of the reel 24 thereby causing the steam or hot air to flow through the interior of the reel.

Figure 4:
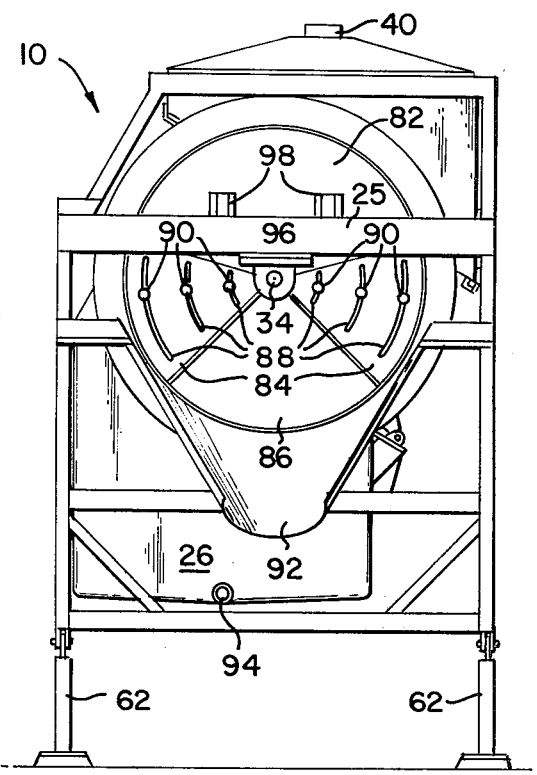
FIG. 4 is an end elevational view of the steaming reel taken from the discharge end.

The discharge structure for the steaming unit 10 and drying unit 12 is best illustrated in FIG. 4. The ends of the reels 24 are closed by a top panel 82 and a pair of discharge doors 84 for adjusting the size of the discharge opening 86. The doors 84 contain annular arcurate slots 88 having a fixedly mounted stud 90 extended therethrough so that the doors 84 may be rotated about the shaft 34. The position of the doors 84 depends upon specific operating characteristics of the steaming and drying units, 10, 12, respectively including the temperature of the steam or hot air entering the unit, the characteristics of the product and the rotational speed of the drum. Product passing through the discharge opening 86 is directed to a conveyor 16 in the case of the steaming unit 10 or 20 in the case of the drying unit 12 by a discharge chute 92.

A steam inlet 94 is positioned near the bottom of the housing 26 of the steaming unit 10, but the inlet 94 is not included in the drying unit 12. As best illustrated in FIG. 4, but also shown in FIG. 3, the shaft 34 is rotatably mounted on the frame 25 by a bearing 96 which is secured to a frame cross member 25 by bolts 98.

Figure 7:
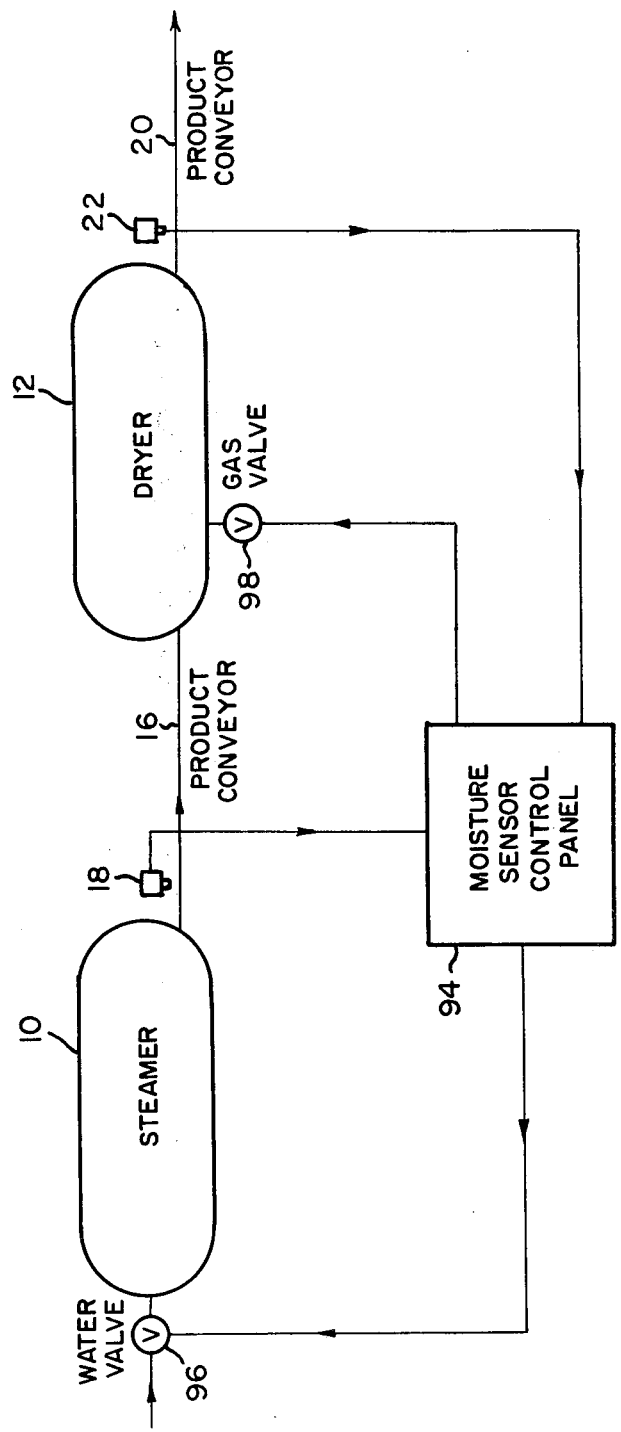
FIG. 7 is a schematic of the moisture sensing and control system.

A schematic of the moisture sensor and control system is illustrated in FIG. 7. The moisture content of product leaving the steamer 10 is measured by the convention moisture sensor 18 identified above. The output of the moisture sensor 18 is applied to a conventional moisture sensor control panel 94 commercially available from Honeywell of Minneapolis, Minnesota. The control panel 94 contains a manually adjustable moisture control lever (not shown) which establishes a moisture set point. The output of the moisture sensor 18 is compared to this set point in order to generate a control signal h is applied to a remotely actuated conventional water valve 96, also commercially available from Honeywell of Minneapolis, Minnesota. The water valve 96 allows water to flow into the steamer 10 through a conventional nozzle which generates a water mist which mixes with the fruit products within the steamer 10. When the sensor 18 determines that the moisture of the fruit product leaving the steamer 10 is above the set point, it causes the control panel 94 to apply an appropriate control signal to the water valve 96 to reduce the flow of water to the steamer 10. Conversely, when the sensor 18 determines that the moisture content of product leaving the steamer 10 is below the set point, it applies an appropriate control signal to the water valve 96 to increase the flow of water into the steamer 10.

As explained above, fruit product leaving the streamer 10 is directed to a drier 12 by a product conveyor 16. Product is removed from the drier 12 by a second product conveyor 20 positioned below a second moisture sensor 22 which may be identical to the moisture sensor 18. The moisture sensor 22 measures the moisture content of product leaving the drier 12 and applies a signal indicative of the moisture content to the moisture sensor control panel 94. The control panel 94 contains a second manually actuatable control lever (not shown) establishing a second set point to which the output of the sensor is compared. When the moisture content of product leaving the drier 12 is above the set point the control panel 94 applies an appropriate control signal to a conventional remotely actuated gas valve 98 to reduce the flow of gas to the heater unit for the drier 12. Inversely, when the moisture sensor 22 determines that the moisture content of product leaving the drier 12 through product conveyor 20 is below the set point the control panel 94 applies an appropriate signal to the gas valve 98 to increase the flow of gas to the heater. The moisture sensor and control system thus continuously adjusts the flow of water to the steamer 10 and the flow of heating gas to the drier 12 so that the moisture content of product measured by respective sensors 18, 22 is maintained at a predetermined value.

The improved moisture control and equalizing system is thus capable of quickly and inexpensively processing fruit products which require a uniform and consistent moisture content and if required, the sulphur dioxide content may be simultaneously regulated by utilizing a continuous process instead of the conventional batch process, and by first increasing the moisture content and sulphur dioxide content of the product beyond the final or target value and then reducing the moisture content and sulphur dioxide concentration to the target value. As previously stated the same basic equipment and mode of operation may be used on various fruit products wherein it is required to equalize and control the moisture content of the end product. The equipment employed and the overall system are also adaptable for use in adding solids, preservatives, nutrients and other substances during moisture equalization treatment.

The embodiments of the invention in which a particular property or privilege is claimed are defined as follows:

1. A system for equalizing the moisture content of fruit products, comprising:

a moisturizing means for increasing the moisture content of said fruit product above a predetermined target value, said moisturizing means comprising an elongated, generally horizontally disposed housing, a porous drum rotatably disposed in said housing, infeed means at one end of said housing for delivering fruit product to be moisturized into said porous drum, discharge means at the opposite end of said housing to receive and convey moisturized fruit product from said moisturizing means, moisture injectors positioned in said housing and adapted to disburse moisture on to the fruit product as the fruit product is conveyed from the infeed end of said drum to said discharge means, moisture sensing means to sense the moisture content of the fruit product as the fruit product is discharged from said moisturizing means and means controlled by said moisture sensing means to alter the moisture disbursed by the moisture injectors to achieve the predetermined moisture value;

drier means for reducing the moisture content of the fruit product to said predetermined target value, said drier means comprising an elongated, generally horizontally disposed drier housing, a porous drum rotatably positioned in said drier housing, drum rotating means interconnected to said drum for rotating said drum, a hot air inlet and an exhaust port interconnected to said drier housing, means forcing hot air into said housing and suction means for extracting air and gases from said drier housing and venting said air and gases to atmosphere and discharge means at the end of the drum opposite said conveying means;

conveying means positioned between said moisturizing means and said drier means to move the moisturized fruit product to the drier means;

moisture sensing means adjacent said discharge means to sense the moisture in the fruit product and means controlled by said moisture sensing means to alter the temperature of the air introduced into said drier means whereby the fruit product produced has a moisture content approximating the predetermined target value.

2. A system for equalizing moisture as in claim 1 wherein means is provided in each of said porous drums for aggitating the fruit product as the product moves through said drums.

3. The system of claim 1 wherein said fruit product exits said housings through discharge openings, and wherein the size of said discharge openings is adjustable by varying the position of a pair of discharge doors slidably mounted to move toward and away from each other.

4. The system of claim 1 wherein said housing are supported at one end by pivotally mounted legs such that the opposite end of said housing may be raised or lowered to adjust the longitudinal angle of inclination of said housings thereby adjusting the rate at which said fruit product is conveyed through said housings.

5. A system as in claim 1 including means for introducing sulphur dioxide into said moisturizing means simultaneously with the introduction of moisture to cause the sulphur dioxide to penetrate the fruit product as it moves through said moisturizing means.

* * * * *